United States Patent [19]

Schwark

[11] Patent Number: 5,021,533
[45] Date of Patent: * Jun. 4, 1991

[54] CROSSLINKABLE POLY(THIO)UREASILAZANE COMPOSITION CONTAINING A FREE RADICAL GENERATOR

[75] Inventor: Joanne M. Schwark, Wilmington, Del.

[73] Assignee: Hercules Incorporated, Wilmington, Del.

[*] Notice: The portion of the term of this patent subsequent to May 29, 2007 has been disclaimed.

[21] Appl. No.: 527,613

[22] Filed: May 23, 1990

Related U.S. Application Data

[63] Continuation-in-part of Ser. No. 286,839, Dec. 20, 1988, Pat. No. 4,929,704.

[51] Int. Cl.$^5$ .............................................. C08G 77/06
[52] U.S. Cl. ......................................... 528/21; 528/24; 528/25; 528/28; 525/474
[58] Field of Search ...................... 528/28, 24, 25, 21; 525/474

[56] References Cited

U.S. PATENT DOCUMENTS

| | | | |
|---|---|---|---|
| 4,689,252 | 8/1987 | Lebrun et al. | 427/228 |
| 4,722,988 | 2/1988 | Porte et al. | 528/28 |
| 4,929,704 | 5/1990 | Schwark | 525/474 |

Primary Examiner—Melvyn I. Marquis
Attorney, Agent, or Firm—Joanne W. Patterson

[57] ABSTRACT

A composition that comprises a poly(thio)ureasilazane having at least one alkenyl or alkynyl group and a free radical generator can be crosslinked by an energy input provided in the form of heat, ultraviolet radiation, or an electron beam. The crosslinked poly(thio)ureasilazane compositions can be pyrolyzed to form silicon nitride-containing ceramics.

11 Claims, No Drawings

CROSSLINKABLE POLY(THIO)UREASILAZANE COMPOSITION CONTAINING A FREE RADICAL GENERATOR

This application is a continuation-in-part of U.S. Ser. No. 07/286,839 filed Dec. 20, 1988 now U.S. Pat. No. 4,929,704.

FIELD OF THE INVENTION

This invention relates to poly(thio)ureasilazanes, a method for preparing such polymers, and silicon nitride-containing ceramic materials produced by pyrolysis of the cured or uncured polymers.

BACKGROUND OF THE INVENTION

Silicon nitride has generated considerable interest as a ceramic material because of its high thermal and oxidative stability and extreme hardness. Other advantageous properties include low electrical conductivity, low coefficient of thermal expansion, excellent thermal shock and creep resistance, high strength at elevated temperatures and excellent corrosion resistance.

One recently developed method for obtaining silicon nitride containing ceramic materials is the pyrolysis of polyorganosilazanes. Seyferth et al. (U.S. Pat. No. 4,482,669) describe the base catalyzed crosslinking of the ammonolysis product of an organodihalosilane to form a polysilazane ceramic precursor. This material is especially useful as a binder for ceramic powders. Verbeek (U.S. Pat. No. 3,853,567) produced shaped forms such as fibers comprising a homogeneous mixture of silicon carbide and silicon nitride by pyrolyzing a fusible carbosilazane resin in an inert atmosphere. Lebrun and Porte (U.S. Pat. No. 4,689,252) describe the preparation of polysilazanes by the platinum catalyzed hydrosilation reaction of a silazane or a mixture of silazanes that contain both Si H and unsaturated hydrocarbon groups. These polymers can be crosslinked by heating and can be used for coating or impregnating substrates with ceramic material after pyrolyiis. Laine and Blum (U.S. Pat. No. 4,612,383) describe the catalytic activation of Si-H, Si-Si or Si-N bonds in silanes or silazanes by metal complexes to give oligomers and polymers. The products can be pyrolyzed to silicon nitride. King et al. (U.S. Pat. No. 4,675,424) describe the preparation of polysilazanes by the reaction of an aminosilane with a low molecular weight amine in the presence of an acid catalyst. Such polymers can be pyrolyzed under nitrogen to give silicon nitride-containing ceramics. Porte and Lebrun (U.S. Pat. No. 4,722,988) disclose the preparation of polysilazane precursors for ceramics by crosslinking silazanes containing alkenyl or alkynyl substituents in the presence of a free radical generator such as a peroxide. Fink (U.S. Pat. No. 3,239,489) describes the preparation of polyureasilazanes having no mobile hydrogen atoms by the reaction of di or polyfunctional isocyanates with silazanes. Pyrolysis of these polymers to ceramic materials is not disclosed.

In general, the above methods are deficient in that it is difficult or impossible to control the viscosities of the polysilazanes so that they are suitable for the intended end use of the polymer. For example, low viscosities are desirable for polymers used to produce thin films or to infiltrate porous ceramic bodies, and high viscosities are desirable for making fibers.

SUMMARY OF THE INVENTION

A method has now been found for preparing poly(thio)-ureasilazanes in which the viscosity of the polymer can be easily controlled. The notation "poly(thio)ureasilazane" is meant to include polyureasilazanes and polythioureasilazanes. These polymers are liquid, are soluble in common organic solvents and are stable in the absence of moisture. The polymers are prepared by a method comprising (1) preparing a silazane ammonolysis product by reacting ammonia with a halogenated silicon compound selected from the group consisting of $RSiX_3$, $RR'SiX_2$ and mixtures thereof, wherein X is selected from the group consisting of Cl, Br and I; and R and R' are the same or different and ar selected from the group consisting of H, substituted or unsubstituted 2-6 carbon alkyl, aryl, 2-6 carbon alkenyl and 1-6 carbon alkynyl groups, at least one of the halogenated silicon compounds containing a Si-H bond, (2) reacting the silazane ammonolysis product with from about 0.1 % to about 30 % by weight, based on the weight of the ammonolysis product, of an isocyanate or isothiocyanate, and (3) heating to a temperature not exceeding 300° C. for a time sufficient to partially crosslink the poly(thio)ureasilazane and increase the viscosity to a value suitable for the desired end use of the polymer. Polymers where at least one of R and R' is an alkenyl or alkynyl group can be cured by supplying energy to generate free radicals. The cured or uncured poly(thio)ureasilazanes can be used to prepare silicon nitride containing ceramic materials by heating to a temperature of at least 800° C. in an inert or ammonia containing atmosphere.

DETAILED DESCRIPTION OF THE INVENTION

The first step of the process for preparing the poly (thio)ureasilazanes used in the compositions of tis invention comprises reacting ammonia, or a mixture of ammonia and a substituted or unsubstituted 1-4 carbon alkyl or aryl amine, with a halogenated silicon compound selected from the group consisting of $RSiX_3$, $RR'SiX_2$ and mixtures thereof, including mixtures where more than one compound having the formula $RSiX_3$ or $RR'SiX_2$ is used. Optionally, $RR'R''SiX$, $SiX_4$ or mixtures thereof can also be present in the reaction mixture. X can be Cl, Br, or I. Cl is preferred. R, R' and R'' can be the same or different and are selected from the group consisting of H, substituted or unsubstituted 1-6 carbon alkyl, aryl, 1-6 carbon alkenyl and 1-6 carbon alkynyl groups. At least one of the halogenated silicon compounds must have a Si-H bond. Examples of suitable halogenated silicon compounds include, for example, methyldichlorosilane, vinylmethyldichlorosilane, tetrachlorosilane, tetrabromosilane, trichlorosilane, vinyltrichlorosilane, methyltrichlorosilane, phenyltrichlorosilane, ethyltrichlorosilane, propyltrichlorosilane, butyltrichlorosilane, methyltribromosilane, dimethyldichlorosilane, phenylmethyldichlorosilane, dimethyldibromosilane, trimethylchlorosilane, dimethylchlorosilane, dimethylvinylchlorosilane, and trimethylbromosilane.

When ammonia alone is reacted with the halogenated silicon compound, the ammonolysis product formed is predominantly cyclic, but can possibly contain small amounts (usually less than 1%) of linear species. When a mixture of ammonia and an alkyl or aryl amine is used, the ammonolysis product contains more linear than cyclic species.

The ammonolysis product is then reacted with from about 0.1 % to about 30 %, based on the weight of the ammonolysis product, of an isocyanate or isothiocyanate, at a temperature of less than 200° C. Use of from about 1 % to about 10 % by weight of an iso(thio)cyanate is preferred. The reaction can be carried out with or without a solvent, although it is preferably carried out without a solvent. Although the exact reaction mechanism is not known, it is believed that the reactant is inserted into the Si-N bond of the silazane ammonolysis product.

Isocyanates and isothiocyanates suitable for the preparation of poly(thio)ureasilazanes used in the compositions of this invention can be monofunctional or polyfunctional, substituted or unsubstituted 1-6 carbon alkyl, aryl, 2-6 carbon alkenyl or 2-6 carbon alkynyl compounds. Aryl is preferred. Suitable compounds include, but are not limited to, 2,6-tolylene diisocyanate, phenyl isocyanate, phenyl isothiocyanate, phenylmethyl isocyanate, 2,4-tolylene diisocyanate, 5-bromotolylene-2,4-diisocyanate, 3-chlorotolylene 2,6-diisocyanate, diphenylmethane-4,4'-diisocyanate, diphenylethane-2,2'-diisocyanate, napthalene diisocyanate, 2,5-dimethoxybenzene 1,4-diisocyanate, and m-tetramethylxylylene diisocyanate.

The poly(thio)ureasilazane that is produced by the reaction of the ammonolysis product with an iso(thio)cyanate comprises the following units:

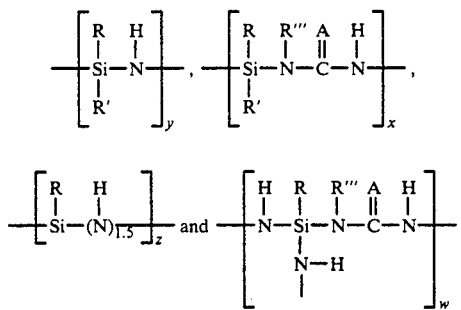

where A is O or S, R and R' have the same meaning as described above, and at least one of R and R' is hydrogen. R''' has the same meaning as R and R'. Except for the case where R''' is H, R''' is the organic group derived from the iso(thio)cyanate. If a polyfunctional iso(thio)cyanate is used in the preparation of the polymer, R''' can be substituted by one or more iso(thio)cyanate groups, which also react during the formation of the poly(thio)urea silazane. The values of x and y depend upon the amount of iso(thio)cyanate used in the reaction, i.e., x+w=0.1 % to 30 % and y+z=99.9 % to 70 % of the polymer units. In the formula, w and z can be 0 or x and y can be 0.

The units

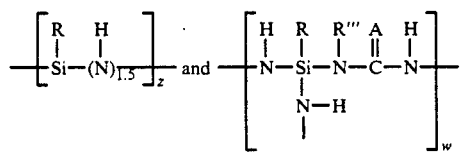

are present only if $RSiX_3$ is present in the reaction mixture.

After formation of the poly(thio)ureasilazane heat can be supplied to raise the temperature to not greater than 300° C., preferably from 110° to 180° C., to initiate partial crosslinking as indicated by a substantial increase in molecular weight and viscosity, e.g., an increase in viscosity from 15 to 20,000 cps at 25° C., and evolution of hydrogen gas. There is no evolution of gas if the poly(thio)ureasilazane does not contain Si-H groups. The viscosity of the final product can be controlled by varying the amount of the compound that is reacted with the silazane ammonolysis product, e.g., by varying the amount of iso(thio)cyanate that is added. Low levels of reactant produce low viscosity polymers, while higher levels produce extremely viscous polymers .The viscosity is also affected by the heating temperature, i.e., higher temperatures yield higher viscosities. The viscosity can therefore be tailored to the end use of the polymer. For most applications a material that is soluble or fusible is preferred.

Poly(thio)ureasilazanes that contain at least one alkenyl or alkynyl group can be further crosslinked, i.e., cured, by supplying energy to generate free radicals. For example, the polymer can be heated in the presence of a free radical generator. The polymers can also be cured by exposing the polymer to UV light or electron beam radiation.

The poly(thio)ureasilazane compositions of this invention contain a free radical generator in an amount effective to crosslink the polymer. Suitable free radical generators include, for example, peroxides and azo compounds.

An effective quantity of a free radical generator means a quantity sufficient to crosslink the poly(thio)ureasilazane properly. The concentration of the free radical generator is generally from 0.01 to 5.0 wt. % of the polymer.

Exemplary peroxides for use in the present invention include, in particular, diaroyl peroxides such as dibenzoyl peroxide, di p chlorobenzoyl peroxide, and bis-2,4-dichlorobenzoyl peroxide; dialkyl peroxides such as 2,5-dimethyl-2,5-di(t butylperoxy)hexane and di t-butyl peroxide; diaralkyl peroxides such as dicumyl peroxide; alkyl aralkyl peroxides such as t butyl cumyl peroxide and 1,4-bis(t-butylperoxyisopropyl)benzene; alkylaroyl peroxides and alkylacyl peroxides such as t-butyl perbenzoate, t-butyl peracetate, and t-butyl peroctoate.

It is also possible to use peroxysiloxanes as described, for example, in U.S. Pat. No. 2,970,982 and peroxycarbonates such as t-butylperoxy isopropyl carbonate.

Symmetrical or unsymmetrical azo compounds, such as the following, may be used as free radical generators: 2,2'-azobis(2-methylpropionitrile); 2,2'-azobis(2,4-dimethyl4-methoxyvaleronitrile); 1-cyano-1-(t-butylazo)cyclohexane; and 2-(t-butylazo)isobutyronitrile. These products are well known and are described, for example, in U.S. Pat. No. 2,492,763 and 2,515,628.

The poly(thio)ureasilazane compositions according to the invention can additionally contain fillers. Suitable fillers include, for example, $SiO_2$, $Si_3N_4$, SiC in the form of a powder or whiskers, BN, $B_2O_3$, $B_4C$, AlN, $Al_2O_3$, TiN, TiC, $ZrO_2$, Si and ZrC.

The cured or uncured poly(thio)ureasilazanes can be pyrolyzed at a temperature of at least 800° C. under an inert or ammonia containing atmosphere to yield a silicon nitride-containing ceramic material.

The poly(thio)ureasilazanes can be used in the preparation of ceramic fibers and foams, in the infiltration of a preform structure and subsequent pyrolysis to produce a composite silicon nitride containing structure, in the production of oxidation resistant coatings, as a thin film for electronic applications, as an adhesive or sealant and as a binder for ceramic or metal powders.

Example 1

A 5 liter, three-necked flask is equipped with an overhead mechanical stirrer, a dry ice/acetone condenser ($-78°$ C.), an ammonia/nitrogen inlet tube and a thermometer. The apparatus is sparged with nitrogen and then charged with hexane (1760 ml, dried over 4 A molecular sieves), methyldichlorosilane (209 ml, 230.9 g, 2.0 mol) and vinylmethyldichlorosilane (64 ml, 69.6 g, 0.5 mol). The ammonia is added at a rate of 3.5 l/min (9.37 mol) for one hour. During the addition, the temperature of the reaction rises from 25° to 69° C. After one hour, the ammonia flow is stopped and the reaction mixture cooled to room temperature. The reaction mixture is filtered on a glass-fritted funnel to remove the precipitated ammonium chloride. The hexane is removed from the filtrate under reduced pressure (28 mm Hg, 60° C.) to give a polysilazane $[(CH_3SiHNH)_{0.8}(CH_3SiCH=CH_2NH)_{0.2}]_x$ as a clear oil (150.76 g, 2.34 mol, 94 % yield). The oil has a viscosity of 43 cps at 25° C. and a molecular weight of 560 g/mol.

A 250 ml, one-necked flask is equipped with a stir bar and septum and sparged with nitrogen. The flask is charged with 109.76 g of the polysilazane by cannula. Phenylisocyanate (5.96 ml, 6.53 g) is added by syringe in 0.5 ml aliquots at five minute intervals. The reaction mixture is stirred at room temperature for two hours. The flask is then equipped with a reflux condenser topped with a nitrogen inlet needle and the reaction mixture is heated at 120° C. for 20 hours. Gas evolution is observed. After 20 hours, the reaction mixture is cooled to room temperature and a polyureasilazane in the form of a viscous, yellow oil is obtained. The polyureasilazane has a thermogravimetric analysis (TGA) yield of 59.4 wt. % (20° C./min, 25-950° C., under nitrogen).

Examples 2-5

A 17 ml vial is charged with the amount of dicumyl peroxide indicated in Table 1. The vial is capped and sparged with nitrogen. The appropriate weight of the polyureasilazane prepared as described in Example 1 is added by syringe. The reaction mixture is mixed on a vortex mixer to evenly distribute the free radical generator.

The mixtures are then placed in a 160° C. bath. During the crosslinking process, an exotherm is observed. The highest temperature reached during this exotherm is noted as the "Max. T(° C)" in the Table. In addition, the time required for the maximum temperature to be attained is recorded. In each case, solids are obtained. Thermogravimetric analysis (TGA) yields are obtained (20° C./min, 25-950° C., under nitrogen).

TABLE 1

| Example | Wt. % Peroxide | Max. T (°C.) | Time (min) | TGA Yield (Wt. %) |
|---|---|---|---|---|
| 2 | 0.1 | 188.5 | 10.47 | 75.8 |
| 3 | 0.5 | 213.5 | 3.75 | 78.9 |
| 4 | 1.0 | 224.3 | 2.58 | 78.9 |

TABLE 1-continued

| Example | Wt. % Peroxide | Max. T (°C.) | Time (min) | TGA Yield (Wt. %) |
|---|---|---|---|---|
| 5 | 5.0 | 220.5 | 2.85 | 78.5 |

Examples 6-9

The apparatus used in Examples 2-5 is charged with the polyureasilazane prepared as described in Example 1 and bis(t-butylperoxy)diisopropylbenzene in the amounts specified in Table 2. The mixtures are heated as in Examples 2-5 and solids are obtained. TGA yields are listed in Table 2.

TABLE 2

| Example | Wt. % Peroxide | Max. T (°C.) | Time (min) | TGA Yield (Wt. %) |
|---|---|---|---|---|
| 6 | 0.1 | 230.0 | 4.00 | 79.2 |
| 7 | 0.5 | 244.0 | 3.25 | 79.3 |
| 8 | 1.0 | 217.6 | 2.95 | 79.2 |
| 9 | 5.0 | 248.8 | 2.25 | 78.1 |

Example 10

The apparatus used in Examples 2-5 is charged with the polyureasilazane prepared as described in Example 1 and 0.5 wt. % of o trimethylsilyl-t-butylperoxide. The mixture is placed in an oil bath at room temperature and slowly heated. At a bath temperature of 150° C., an exotherm is observed. The maximum temperature attained is 206.9° C. A solid is obtained with a TGA yield of 79.4 wt. %.

Examples 11-13

The apparatus used in Examples 2-5 is charged with the polyureasilazane prepared as described in Example 1 and 2,2'-azobis(2 methylpropionitrile) (AIBN) in the amounts specified in Table 3. The mixtures are heated as in Examples 2-5 (starting with a room temperature oil bath) and solids are obtained. TGA yields are listed in Table 3.

TABLE 3

| Example | Wt. % AIBN | Max. T (°C.) | TGA Yield (Wt. %) |
|---|---|---|---|
| 11 | 0.5 | 168.4 | 71.8 |
| 12 | 1.0 | 152.5 | 75.6 |
| 13 | 5.0 | 149.6 | 74.9 |

Example 14

A 100 ml one necked flask equipped with a stir bar and a septum is sparged with nitrogen and charged with 10.0 g of the silazane prepared as described in the first paragraph of Example 1 and 0.03 g of 2,6-tolylene diisocyanate (TDI). The flask is placed in an oil bath on a stirrer/hot plate and the septum is replaced with a water condenser that is capped with a septum. A nitrogen inlet needle and oil bubbler outlet are placed in the septum. The reaction mixture is then heated to 130° C. under a nitrogen atmosphere for 17 hours. Evolution of hydrogen gas is observed. After cooling to room temperature, the viscosity of the liquid polyureasilazane is 1600 cps, measured at 25° C. using a Brookfield cone and plate viscometer.

The polyureasilazane is mixed with dicumyl peroxide (0.5 wt. % based on the weight of the polyureasilazane used) and the reaction mixture is heated in an oil bath.

At a temperature of 140° C., the liquid polymer becomes a brittle, glassy solid. The char yield for the uncured and cured polyureasilazane is determined by thermogravimetric analysis (TGA) under a flow of nitrogen after heating the sample at 10° C./min from room temperature to 950° C.

|  | TGA Yield (%) |
| --- | --- |
| Uncured polyureasilazane | 53.6 |
| Cured polyureasilazane | 83.6 |

I claim:

1. A poly(thio)ureasilazane composition that is capable of being crosslinked by an energy input comprising (a) a poly(thio)ureasilazane containing at least one 2–6 carbon alkenyl or alkynyl group, and (b) at least one free radical generator in an amount effective to crosslink the poly(thio)ureasilazane.

2. The composition according to claim 1, wherein the alkenyl group is a vinyl group.

3. The composition according to claim 1, wherein the free radical generator is an azo compound.

4. The composition according to claim 3, wherein the azo compound is 2,2'-azobis(2-methylpropionitrile).

5. The composition according to claim 1, wherein the free radical generator is a peroxide.

6. The composition according to claim 5, wherein the peroxide is dicumyl peroxide.

7. The composition according to claim 1 further comprising a filler.

8. The composition of claim 1, wherein the free radical generator is present in an amount of 0.01 to 5.0 wt. % of the poly(thio)ureasilazane.

9. A process for crosslinking a poly(thio)-ureasilazane composition comprising a poly(thio)ureasilazane containing at least one 2–6 carbon alkenyl or alkynyl group and a free radical generator, said process comprising the step of exposing the poly(thio)ureasilazane composition to an energy input in an amount effective to generate free radicals and crosslink the poly(thio)ureasilazane.

10. The process according to claim 9, wherein the poly(thio)ureasilazane composition is heated to a temperature of 30° to 300° c.

11. The process according to claim 10, wherein the temperature range is from 100° to 200° C.

* * * * *

UNITED STATES PATENT AND TRADEMARK OFFICE
CERTIFICATE OF CORRECTION

PATENT NO. : 5,021,533

DATED : June 4, 1991

INVENTOR(S) : Joanne M. Schwark (Case 1-4)

It is certified that error appears in the above-identified patent and that said Letters Patent is hereby corrected as shown below:

Col. 1, line 27, "base catalyzed" should read --base-catalyzed--;

Col. 1, line 39, "Si H" should read --Si-H--;

Col. 1, line 42, "pyrolyiis" should read --pyrolysis--;

Col. 2, line 39, "tis" should read --this--;

Col. 3, line 24, "3-chlorotolylene 2,6-" should read --3-chlorotolylene-2,6- --;

Col. 4, line 42, "di p chlorobenzoyl" should read --di-p-chlorobenzoyl--;

Col. 4, line 44, "di t butyl" should read --di-t-butyl--;

Col. 4, line 46, "t butyl" should read --t-butyl--;

Col. 4, lines 55 and 56, "2,2'-azobis(2,4-dimethyl4-methoxyvaleronitrile);" should read --2,2'-azobis(2,4-dimethyl-4-methoxyvaleronitrile);--;

UNITED STATES PATENT AND TRADEMARK OFFICE
CERTIFICATE OF CORRECTION

PATENT NO. : 5,021,533
DATED : June 4, 1991
INVENTOR(S) : Joanne M. Schwark (Case 1-4)

It is certified that error appears in the above-identified patent and that said Letters Patent is hereby corrected as shown below:

Col. 6, line 27,"o trimethylsily" should read
-- o-trimethylsilyl-- and

In the Claims, Col. 8, line 21 (Claim 10) "300ºc"
should read --300ºC.--.

Signed and Sealed this

Thirteenth Day of October, 1992

*Attest:*

DOUGLAS B. COMER

*Attesting Officer*     *Acting Commissioner of Patents and Trademarks*